No. 793,340. PATENTED JUNE 27, 1905.
G. B. BEALE.
ADDING MACHINE.
APPLICATION FILED FEB. 23, 1904.

3 SHEETS—SHEET 1.

Witnesses:
H. S. Gaither
H. M. McDowell

Inventor:
George B. Beale
by L. T. Hopkins
Atty.

No. 793,340. PATENTED JUNE 27, 1905.
G. B. BEALE.
ADDING MACHINE.
APPLICATION FILED FEB. 23, 1904.
3 SHEETS—SHEET 2.
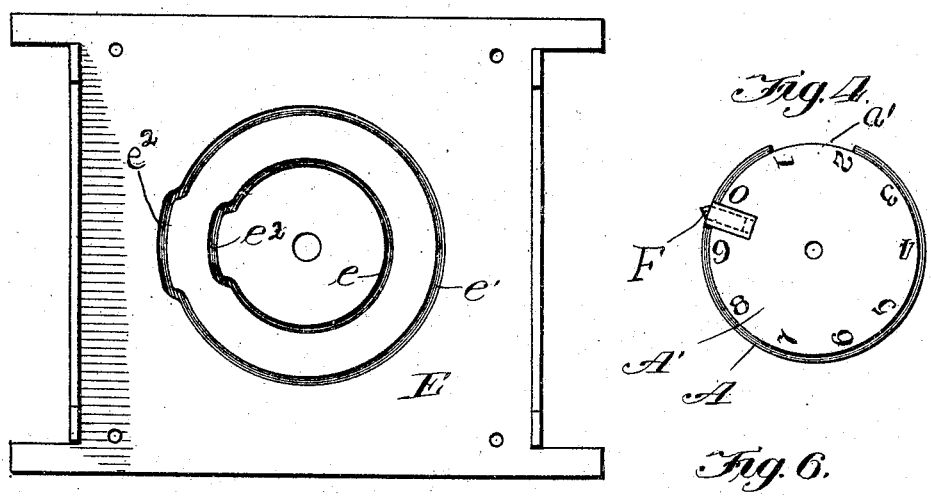
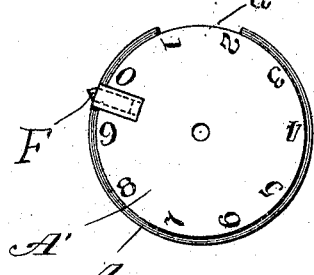
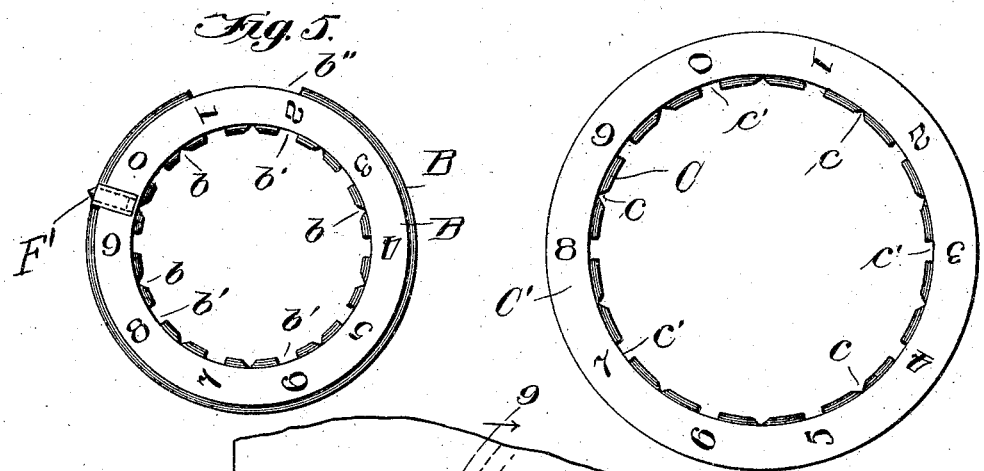
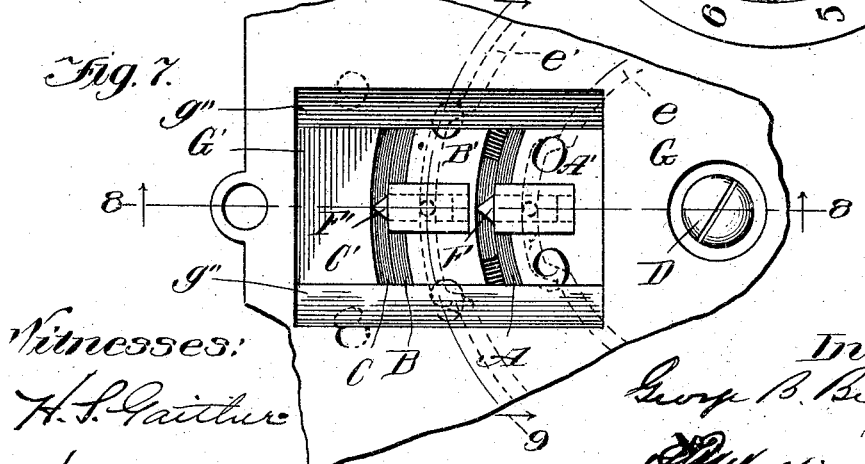
Witnesses:
H. S. Gaither
H. M. McDowell
Inventor:
George B. Beale
by L. S. Hopkins
atty

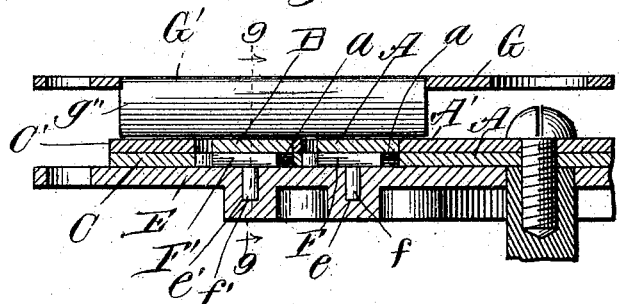
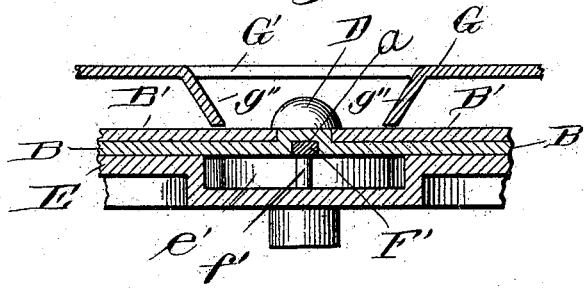
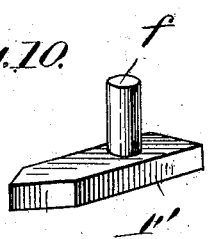
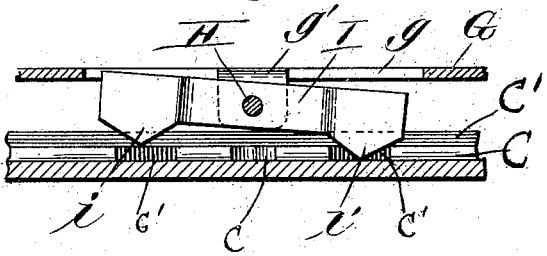
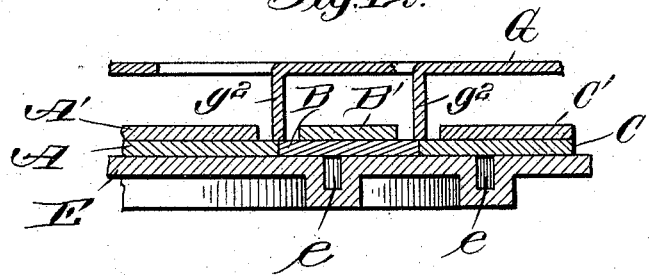

No. 793,340.

Patented June 27, 1905.

UNITED STATES PATENT OFFICE.

GEORGE B. BEALE, OF CHICAGO, ILLINOIS.

ADDING-MACHINE.

SPECIFICATION forming part of Letters Patent No. 793,340, dated June 27, 1905.

Application filed February 23, 1904. Serial No. 194,892.

*To all whom it may concern:*

Be it known that I, GEORGE B. BEALE, a citizen of the United States, residing at Chicago, in the county of Cook and State of Illinois, have invented certain new and useful Improvements in Adding-Machines, of which the following is a specification.

Like many adding-machines now in use a machine embodying the present invention has a series of decimally-related revoluble members—such as wheels, disks, rings, or the like—each of which upon the completion of a revolution advances the one of next higher denomination one decimal-point. I am aware that such machines, broadly considered, are not new, and hence declare that my present invention consists in the features of novelty that are hereinafter described.

The principal objects of the invention are the simplification of machines of this class and the elimination of all springs and movements that are not positive. To these ends I provide each revoluble member of the adding-train with a dog, which at the completion of each revolution of the member carrying it engages the member of next higher denomination and advances it one point, a cam being provided for advancing and retracting the dog, whereby its movements are absolutely positive. Another object of the invention is to provide a lock so related to adjacent revoluble members that each of the lower denomination controls the one of next higher denomination and prevents it from moving until the said one of lower denomination is completing a revolution.

An adding-machine embodying the invention may be used in all situations for which it is adapted. For instance, it may be used on cash-registers, on registering toy banks, on tabulating-machines, &c.

Figure 1:
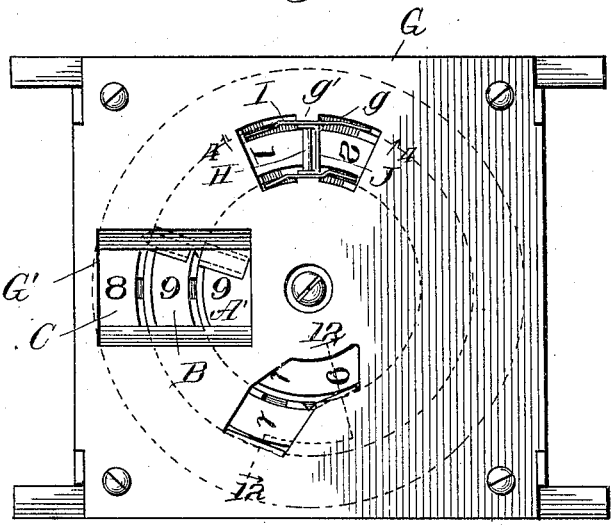
Figure 2:
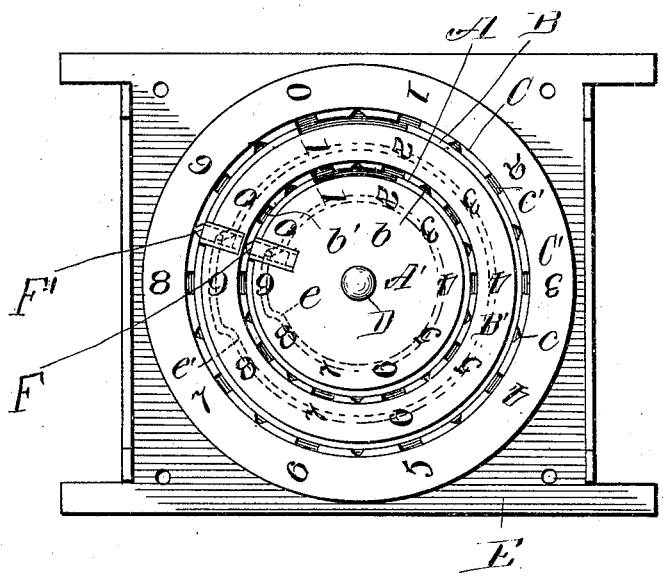

In the accompanying drawings, which are made a part of this specification, Figure 1 is a face view of an adding-machine embodying the invention. Fig. 2 is a similar view with the face-plate removed. Fig. 3 is a face view of the base-plate having the cams by which the dogs are advanced and retracted. Figs. 4, 5, and 6 are face views of the units, tens, and hundreds members, respectively, the dogs for transmitting movement from the units to the tens and from the tens to the hundreds members being also shown. Fig. 7 is a fragmentary view, on a larger scale, showing portions of the revoluble members and the dogs. Fig. 8 is a section thereof on the line 8 8, Fig. 7. Fig. 9 is a section thereof on the line 9 9, Fig. 7. Fig. 10 is a perspective view of one of the dogs. Fig. 11 is a detail showing the lock on line 11 11, Fig. 1. Fig. 12 is a section on the line 12 12, Fig. 1.

It will of course be understood that the adding-train may have any desired number of members, from two up. In the drawings I have shown three members A, B, and C for units, tens, and hundreds, respectively. Each of these members is shown to be in the form of an annular disk, said disks being of successively-increasing diameters and being disposed in the same general plane and revoluble about a common axis D. As shown, the disks are mounted upon a base-plate E, which is flat, excepting that it is provided with two grooves $e$ and $e'$, the side walls of each of which form opposing cams, which perform the functions of projecting and retracting dogs F and F', one of which is carried by the disk A and the other by the disk B. To house these dogs and permit them to move freely inward and outward in directions that are radial with respect to the disks, each of the disks is provided on its under side with a groove $a$. As more clearly shown in Figs. 8 and 9, these grooves are the result of stamping portions of the metal of the disk out of the general plane thereof. This results in a rib on the upper and outer face of the disk, and in order that the top surface of the disk as a whole shall be flat facings A', B', and C', of celluloid or some other suitable material, are secured to them. These facings are equal in thickness to the height of the ribs, and the numerals from "1" to "9" and "0" are placed upon them at intervals of thirty-six degrees.

The dogs have on their under sides studs $f$ and $f'$, which occupy the grooves $e$ $e'$, respectively, whereby as the disks are rotated each of the dogs will be advanced or projected and retracted radially once during each revolution of the disk carrying it. The inner margin of the disk B is provided with ten V-shaped notches $b$, located at thirty-six degrees apart and adapted to receive the V-shaped end of the dog F when the latter is projected by the rise in the cam $e$. When so projected, the dog will be held in engagement with the notch by the portion $e^2$ of the cam-groove, and thus compel the disk B to partake of the rotary movement of the disk A until the stud $f$ passes the portion $e^2$ of the cam and is again retracted or withdrawn radially. In this way each complete revolution of the disk A advances the disk B through one decimal-point—a tenth of a revolution. In like manner at each complete revolution of the disk B the dog F' is advanced into engagement with similar V-shaped notches $c$ in the inner margin of the disk C.

It will be observed that the cam-grooves or the cam-surface bounding them positively control the positions and movements of the dogs, no springs of any description being used for this purpose. The advantage in making the ends of the dogs and the notches for receiving them of V shape is that during the process of engagement and disengagement friction between the ends of the dogs and the sides of the notches is eliminated. This is because the sides of the notches are disposed in the direction in which the end of the dog travels, due to its compound movement—laterally as it is carried along by the disk and radially under the influence of the cam. The disk A is provided in its margin with a notch $a'$, extending through about thirty-six degrees, and the inner margin of the disk B is provided with ten notches $b'$, located thirty-six degrees apart from center to center. In like manner the outer margin of the disk B is provided with a notch $b''$, extending through about thirty-six degrees, and the inner margin of the disk C is provided with ten notches $c'$ thirty-six degrees apart.

The face-plate G has downturned perforated ears $g'$, which are located in line with a radius of the disks and may be made by slashing and turning down portions of the plate, other portions being removed to provide an opening $g$ for the accommodation of locking-pawls I, that are arranged to oscillate on a shaft H, the ends of which occupy the perforations of the ears. Said pawls are held at the proper distance apart by a spacing-plate J, having laterally-projecting ends which are perforated for the passage of the shaft H. As shown in Figs. 1 and 11, each of these pawls has at one end a downward projection $i$, hereinafter called the "toe," and at the other end a similar projection $i'$, hereinafter called the "heel." The toe $i$ of each pawl is adapted to bear upon the margin of one of the disks, while its heel $i'$ is adapted to bear upon the margin of the adjacent disk. These pawls are of similar construction, and one is to the disks A and B as the other is to the disks B and C, so that a description of one will suffice for both. Considering the pawl I with relation to the disks B and C, the toe $i$ and the heel $i'$ are adapted to bear upon said disks in the paths of notches $b''$ and $c'$, respectively. The disk A has in its outer margin a notch $a'$, corresponding with a notch $b''$ of the disk B, and the latter has in its inner margin notches $b'$, corresponding with the notches $c'$ of the disk C. With this arrangement it will be seen that as the disk B is rotated this notch $b''$ will in time come to the toe $i$ of the pawl and at the same time the dog F'' comes to one of the notches $c$ of the disk C. As the rotation continues the rear wall of one of the notches $c'$, in which the heel $i'$ of the pawl has rested during the preceding movement of the disk B, will impinge against the cam-surface of said heel and rock the pawl, thereby freeing the disk C and at the same time causing the toe $i$ to enter the elongated notch $b''$ of the disk B. While this shifting of the pawl is taking place, the rise in cam $e$ forces the dog F' into one of the notches $c$ of the disk C. As the rotation of the disk B continues and until the stem $e'$ of the dog F' passes the part $e^2$ of the cam the disk C will be carried along with the disk B, the pawl meanwhile remaining at rest with its toe $i$ in the elongated notch $b''$ and its heel dragging on the margin of the disk B. After the dog F' leaves the part $e^2$ of the cam it will be retracted and at the same time the rear wall of the notch $b''$ will come in contact with the cam-surface of the toe $i$, and thereby rock the pawl in the opposite direction, throwing its heel $i'$ into the next succeeding notch $c'$ of the disk C and bringing its toe onto the face of the disk B. The pawl will be held in this position until the disk B completes another revolution by reason of the fact that its toe $i$ will meanwhile rest upon and be held up by the margin of the disk B.

The face-plate has an opening G', through which the totals may be viewed, and the margins of this opening are turned down, as shown at $g''$, so as to lie close to the surfaces of the disks, and thereby prevent their displacement. To the same end, the face-plate is provided with downturned lugs $g^2$, which bear upon the margins of adjacent disks.

In Figs. 1, 2, 4, 5, and 6 the parts are shown in positions which they occupy when a total of eight hundred and ninety-nine has been registered, while in Figs. 7, 8, and 9 they are shown in the positions which they occupy when a total of nine hundred is about to be registered.

What I claim as new, and desire to secure by Letters Patent, is—

1. In an adding-machine, the combination of a plurality of revoluble members having coincident axes and bearing numerals, a dog carried by a member of one denomination and adapted to engage a member of another denomination, a cam for advancing the dog to engaging position whereby movement is transmitted from one member to another, a cam for retracting the dog, and means for locking the member to which movement is transmitted as aforesaid, substantially as described.

2. In an adding-machine, the combination of a plurality of revoluble members having coincident axes, and bearing numerals, means for transmitting movement from one of the said members to another, and a locking-pawl consisting of a lever, the opposite ends of which have direct engagement with said members, respectively, whereby it is actuated by movements derived from them and adapted to lock the member to which movement is transmitted as aforesaid, substantially as described.

3. In an adding-machine, the combination of a plurality of revoluble members having coincident axes and bearing numerals, a dog carried by a member of one denomination and adapted to engage a member of another denomination, means for advancing the dog to engaging position whereby movement is transmitted from one member to another, means for retracting the dog, and a pawl having a toe and a heel disposed in operative relation to said members and adapted to be operated by movement derived from them for locking the member to which movement is transmitted, as aforesaid, said members having notches and said toe and heel having cam-surfaces adapted to coöperate therewith, substantially as described.

4. In an adding-machine the combination of a plurality of revoluble members having coincident axes and bearing numerals, a dog carried by a member of the lower denomination and adapted to engage a member of higher denomination, means for advancing the dog to engaging position whereby movement is transmitted from the member of the lower denomination to the member of higher denomination, means for retracting the dog, and a locking-pawl for restraining the member of higher denomination, said pawl having features directly engaging said members, respectively, whereby it is positively moved in both directions, substantially as described.

5. In an adding-machine, the combination of a plurality of revoluble members having coincident axes, and bearing numerals, a dog carried by a member of lower denomination and adapted to engage the member of next higher denomination, a cam for advancing and retracting the dog and a locking-pawl having a toe and heel, disposed in operative relation to said members, respectively, said members having notches adapted to coöperate with said toe and heel, substantially as described.

6. In an adding-machine, the combination of a plurality of disks of successively-increasing diameters, said disks being revoluble about a common axis and bearing numerals on their flat faces, a stationary base-plate upon which said disks are mounted, means for positively revolving one of said disks, and means for transmitting movement from one disk to the other, substantially as described.

7. In an adding-machine the combination of a plurality of disks of successively-increasing diameters, the said disks being revoluble about a common axis and bearing numerals on their flat faces, a stationary base-plate upon which said disks are mounted, means for positively revolving one of said disks and automatically-operated means for transmitting movement from one disk to another and means for locking the disk to which movement is transmitted as aforesaid during inactive periods of the transmitting means, substantially as described.

8. In an adding-machine the combination of a plurality of disks of successively-increasing diameters, said disks being revoluble about a common axis and bearing numerals on their flat faces, a dog carried by one disk and adapted to engage another for transmitting movement from the one to the other, means for advancing and retracting the dog, and means for locking the disk to which said movement is transmitted as aforesaid, said locking means having a part adapted to coöperate with the disk from which the movement is derived whereby said locking means are actuated, substantially as described.

9. In an adding-machine the combination of a plurality of annular disks of successively-increasing diameters located in a common plane, said disks being revoluble about a common axis and bearing numerals on their flat faces, a stationary base-plate upon which said disks are mounted, means for positively revolving the disk of the lowest denomination a dog carried by a disk of lower denomination and adapted to engage a disk of higher denomination, and means for transmitting movement from one disk to the other, substantially as described.

10. In an adding-machine the combination of a plurality of annular disks of successively-increasing diameters, located in a common plane, said disks being revoluble about a common axis and bearing numerals on their flat faces, a radially-movable dog carried by a disk of lower denomination and adapted to engage a disk of higher denomination, a cam for advancing and retracting said dog, and locking mechanism operatively related to the two disks for restraining the movement of the disk to which movement is transmitted as aforesaid, substantially as described.

11. In an adding-machine, the combination of a plurality of annular disks located in a common plane, said disks being revoluble about a common axis, a radially-movable dog carried by a disk of lower denomination and adapted to engage a disk of higher denomination, and a base-plate having a cam for advancing and retracting the dog, substantially as described.

12. In an adding-machine, a combination of a disk bearing numerals and having an elongated notch, an annular disk located in the plane of the disk aforesaid, said annular disk bearing numerals and having notches corresponding therewith, means for advancing the annular disk through one point at each complete revolution of the disk first aforesaid, and a rocking lever having a toe and a heel located in the paths of the notches of said disks, respectively, substantially as described.

GEO. B. BEALE.

Witnesses:
H. M. McDonell,
L. M. Hopkins.